(12) United States Patent
Gudenburr et al.

(10) Patent No.: US 10,190,796 B2
(45) Date of Patent: *Jan. 29, 2019

(54) SELF-SEALING CIRCULAR CROSS-SECTION SHEET METAL DUCT AND METHOD FOR MANUFACTURING A SEALED CIRCULAR CROSS-SECTION DUCT

(71) Applicants: Douglas G. Gudenburr, Finleyville, PA (US); Vincent L. Bloom, Beallsville, PA (US)

(72) Inventors: Douglas G. Gudenburr, Finleyville, PA (US); Vincent L. Bloom, Beallsville, PA (US)

(73) Assignee: Ductmate Industries, Inc., East Monongahela, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/892,857

(22) Filed: May 13, 2013

(65) Prior Publication Data

US 2013/0240077 A1    Sep. 19, 2013

Related U.S. Application Data

(60) Continuation of application No. 13/335,188, filed on Dec. 22, 2011, now Pat. No. 8,505,185, which is a
(Continued)

(51) Int. Cl.
*F24F 13/02* (2006.01)
*F16L 25/00* (2006.01)
(Continued)

(52) U.S. Cl.
CPC ........ *F24F 13/0209* (2013.01); *B21C 37/101* (2013.01); *B21D 39/023* (2013.01);
(Continued)

(58) Field of Classification Search
CPC ....... F16L 25/00; F16L 25/0081; F16L 25/10; F24F 13/0209; F24F 13/00; B21C 37/101
(Continued)

(56) References Cited

U.S. PATENT DOCUMENTS 467,999 A    2/1892   Southard
701,468 A    6/1902   Clausing
(Continued)

FOREIGN PATENT DOCUMENTS

JP    S61-111725    5/1986
JP    S61-293570    12/1986

OTHER PUBLICATIONS

"Polymer Adhesives—MSDS and Spec Sheet Downloads", Archived Jan. 30, 2004 at https://web.archive.org/web/20040130133645/http://www.polymeradhesives.com/msds.php.*
(Continued)

*Primary Examiner* — Christopher M Koehler
(74) *Attorney, Agent, or Firm* — Vorys, Sater, Seymour and Pease LLP

(57) ABSTRACT

A circular sheet metal duct having a sealant applied across the longitudinal seam. The sealant will improve the efficiency and will reduce or eliminate air leakage from the longitudinal seam. The sealant is applied during the manufacturing processes so that an installer does not have to seal the duct work. The method of manufacturing the sealant is provided.

18 Claims, 14 Drawing Sheets

Related U.S. Application Data division of application No. 12/041,865, filed on Mar. 4, 2008, now Pat. No. 8,151,430, which is a division of application No. 11/739,238, filed on Apr. 24, 2007, now Pat. No. 7,478,467.

(60) Provisional application No. 60/746,573, filed on May 5, 2006.

(51) Int. Cl.
*F16L 25/10* (2006.01)
*B21D 39/02* (2006.01)
*B21C 37/10* (2006.01)

(52) U.S. Cl.
CPC ........... *F16L 25/0081* (2013.01); *F16L 25/10* (2013.01); *Y10S 285/915* (2013.01); *Y10T 29/4987* (2015.01); *Y10T 29/4998* (2015.01); *Y10T 29/49817* (2015.01); *Y10T 29/49826* (2015.01); *Y10T 29/49879* (2015.01); *Y10T 29/49885* (2015.01)

(58) Field of Classification Search
USPC ....... 29/458, 460, 527.1; 138/162, 163, 164, 138/166, 168; 285/344, 349, 363, 379, 285/424; 81/8.1
See application file for complete search history.

(56) References Cited

U.S. PATENT DOCUMENTS

| | | | | |
|---|---|---|---|---|
| 1,935,690 | A | * | 11/1933 | Zack .............................. 285/331 |
| 1,948,232 | A | * | 2/1934 | Hall .............................. 138/163 |
| 2,038,389 | A | | 4/1936 | Siebenlist |
| 2,039,886 | A | * | 5/1936 | Cohn .............................. 285/330 |
| 2,147,775 | A | | 2/1939 | Miller et al. |
| 2,201,409 | A | | 5/1940 | Siebenlist |
| 2,225,556 | A | | 12/1940 | Delaney |
| 2,698,031 | A | | 12/1954 | Primich |
| 2,750,211 | A | | 6/1956 | Curtis |
| 2,756,778 | A | | 7/1956 | Curtis |
| 2,818,084 | A | * | 12/1957 | Tennison, Jr. ..................... 285/5 |
| 2,866,481 | A | | 12/1958 | Bratsch |
| 2,966,259 | A | * | 12/1960 | Rauscher ................... 242/160.4 |
| 3,146,950 | A | | 9/1964 | Lancaster |
| 3,246,918 | A | | 4/1966 | Burghart |
| 3,295,560 | A | | 1/1967 | Demmler |
| 3,369,568 | A | * | 2/1968 | Davis ........................... 138/168 |
| 3,438,401 | A | * | 4/1969 | Hannes ......................... 138/141 |
| 4,111,143 | A | | 9/1978 | Stubbings |
| 4,218,079 | A | * | 8/1980 | Arnoldt ......................... 285/331 |
| 4,820,569 | A | | 4/1989 | Hinden |
| 4,848,409 | A | * | 7/1989 | Jahnke, Jr. ..................... 138/110 |
| 4,865,890 | A | | 9/1989 | Erlichman |
| 4,941,693 | A | | 7/1990 | Spaude et al. |
| 5,195,789 | A | * | 3/1993 | Walsh et al. .................. 285/331 |
| 5,505,230 | A | * | 4/1996 | Bartholomew ............... 138/164 |
| 5,660,212 | A | | 8/1997 | Elder |
| 6,279,967 | B1 | | 8/2001 | Proctor et al. |
| 8,151,430 | B2 | * | 4/2012 | Gudenburr et al. ............ 29/458 |
| 2001/0026048 | A1 | * | 10/2001 | Proctor et al. ................ 277/603 |
| 2003/0108381 | A1 | | 6/2003 | Walsh et al. |
| 2004/0218975 | A1 | * | 11/2004 | Walsh et al. .................. 403/397 |

OTHER PUBLICATIONS

Q-41-20 Robofoam Mastic Sealant, Q'SO Product Data, Dec. 1997, Q'SO Incorporated, Saginaw.
The Modern Way to Seal Ductwork, Autosealer, Ductmate Industries, Inc., Mar. 6, 1986, pp. 1-6, United States of America.
T1 The New Standard for Round Air Ducts, SNIPS Magazine, Apr. 2006, BNP Media, Troy, MI.
James Gerard, Declaration of James Gerard 37 CFR 1.132, May 21, 2007, pp. 1-2, Pittsburgh.
Duro Dyne Corporation, Duro Dyne Distributor Training Manual, 2005.
Cleats Manufacturing Company, Precision-Made L-Shaped Ductwork, Aug. 15, 2001.
Cleats Manufacturing Company, Precision-Made L-Shaped Ductwork, Feb. 13, 2005.
Sheet Metal Connectors, Inc., Specifications for Rectangular Duct and Fittings, Mar. 2004.
Cleats Manufacturing, Inc., Precision-Made L-Shaped Ductwork, Sep. 8, 2004.
Streimer Sheet Metal Works, Inc., Streimer Fabriduct Line, Jan. 9, 2003.
The Lockformer Company, Lockformer Product Catalog, Undated.
The Lockformer Company, Lockformer Round Oval Machines, 2004.
The Lockformer Company, Lockformer Accessory Machines and Tools Cold Sealant System, 2004.
Carlisle Hardcast, Hardcast Application Matrix, Aug. 2, 2002.
Duro Dyne Corporation, Duro Dyne Material Safety Data Sheet, Jun. 2000.
Carlisle Hardcast, Cold Seal Permanently Tacky Pumpable Seal Sealant, May 2000.
The Lockformer Company, Lockformer HVAC Rollforming Machines, 2004.
Crown Products Company, Inc., Specification Data Sheet Model No. 201 Wallstack Duct, Jan. 15, 2003.
Seal-Tite Duct, Pipe & Fittings, Wall Stack & Wall Stack Fittings (Riser Pipe and Riser Fittings), 2006.
Deflect-O Hardware, Air Distribution Catalog, Jul. 1, 2000.
M&M Manufacturing, Rectangle Duct & Fittings, 2004.
Productions Products, Inc., Used Sheet Metal Fabricating Machinery, Parts & Supplies, Undated.
Ductmate Industries, Inc., Complaint for Patent Infringement against Gray Metal Products, Inc. et al., Aug. 12, 2010.
Gray Metal Products, Inc. and Gray Metal South, Inc., Defendants Answer to Complaint, Counterclaims, Jan. 20, 2011.
Ductmate Industries, Inc., Plaintiff's Answer to Defendants' Counterclaims and Plaintiff's Demand for Jury Trial, Feb. 7, 2011.
Christopher M. Koehler, Non-Final Office Action for U.S. Appl. No. 11/739,238, dated Apr. 18, 2008.
Christopher M. Koehler, Non-Final Office Action for U.S. Appl. No. 12/041,865, dated Jul. 12, 2011.
Serinel Samuel, Examiner's First Report on Australian Patent Application No. 2009200133, dated Nov. 30, 2010.
Lily Truong, Examiner's Report for Canadian Patent Application No. 2,586,640, dated Feb. 9, 2011.
Patrick Brinson, Non-Final Office Action for U.S. Appl. No. 12/040,576, dated Aug. 6, 2008.
Patrick Brinson, Non-Final Office Action for U.S. Appl. No. 12/040,576, dated Apr. 10, 2009.
Patrick Brinson, Restriction and/or Election Requirement for U.S. Appl. No. 11/739,238, dated Dec. 27, 2007.
Ductmate Industries, Inc., Disclosure of Asserted Claims and Infringement Contentions (Including Exhibits), Mar. 28, 2011.
Crown Products Company, Inc., Model No. 401 Specification Data Sheet, Dec. 31, 2002.
SMACNA-HVAC Duct Construction Standards Metal and Flexible (Second Edition) Catalogue.
Duro Dyne Corporation, Duro Dyne Distributor Training Guide 1998 (Duro Dyne Guide 1998).
Georgia Power, Technical Information Handbook, p. 48 (Georgia Power 2002).
AIR-TITE 444 Water Based Pumpable Seam Sealant 2005.
Ductmate Industries, Inc., Ductmate ProSeal 2004.
Ductmate Industries, Inc., Ductmate SOLVSEAL 2004.
Ductmate Industries, Inc., Ductmate 5511m Sealant 1996.
Silicone Solutions, SS-598 Product Description 2004.
Dymax UV Curing Form-in-Place gaskets 2003.
Judge David S. Cercone, Consent Decree in Civil Action No. 2:10-cv-01064, Jun. 20, 2012.

(56) References Cited

OTHER PUBLICATIONS

*Ductmate Industries, Inc.* v. *Gray Metal Products, Inc. et al.*, Civil Action No. 2:10-cv-01064-DSC, Docket Report.
*Ductmate Industries, Inc.* v. *Famous Distribution, Inc. et al.*, Civil Action No. 2:12-cv-1440-AJS, Docket Report.
Ductmate Industries, Inc., Complaint for Patent Infringement against Famous Distribution, Inc., et al., Oct. 4, 2012.
Famous Distribution, Inc., et al., Defendants' Answer to Plaintiffs Complaint and Counterclaims, Dec. 10, 2012.
The Lockformer Company, Lockformer Price List: Effective Jun. 15, 1984.
The Lockformer Company, Lockformer 2008 Catalog (2008).
Declaration of George Raynovich, Jr., Feb. 19, 2013.
Declaration of Robert H. Sturges, Jr., Feb. 12, 2013.
The Lockformer Company, Lockformer 1989 Catalog (1989).
Q'SO Incorporated: Product Data: Q-54 Mastomeric Butyl Sealant Thermally Applied.
Sheet Metal Connectors, Inc., HVAC Accessory Price Catalog, Jan. 1, 2004 Contractor Prices (SMC Sealant 2004).
Duro Dyne Corporation, Duro Dyne Insulation Adhesives—Duct Sealers 2000.
Duro Dyne Corporation, Duro Dyne Pumpurr 1999.
SMACNA, Technical Paper on Duct Leakage (SMACNA 1992).
Ductmate Industries, Inc., Ductmate Solvseal 2002.
Ductmate Industries, Inc., Ductmate EnviroSeal 1999.
Ductmate Industries, Inc., Ductmate EZSEAL 2003.
Ductmate Industries, Inc., ProSeal 2000.
Certification of JP61293570A Translation.
Request for Inter Partes Reexamination of U.S. Pat. No. 7,708,034, Aug. 31, 2012.
Lewis, Aaron J., Office Action in Inter Partes Reexamination, Control No. 95/002,119, dated Nov. 9, 2012.
Ductmate Industries, Inc., Response to Office Action in Inter Partes Reexamination, Control No. 95/002,119, dated Jan. 9, 2013.
Ductmate Industries, Inc., Supplemental Information Disclosure Statement filed for Reexamination Control No. 95/002,119, Feb. 7, 2013.
Third Party Requester's Comments to Patent Owner's Response, Reexamination Control No. 95/002,119, Feb. 8, 2013.
Ductmate Industries, Inc., Second Supplemental Information Disclosure Statement filed for Reexamination Control No. 95/002,119, Feb. 21, 2013.
Third Party Requester's Comments to Patent Owner's "Response" of Feb. 21, 2013 for Reexamination Control No. 95/002,119, Mar. 14, 2013.
Ductmate Industries, Inc., Third Supplemental Information Disclosure Statement filed for Reexamination Control No. 95/002,119, May 23, 2013.
Ductmate Indsutries, Inc., Fourth Supplemental Information Disclosure Statement filed for Reexamination Control. No. 95/002,119, Jul. 18, 2013.
Request for Inter Partes Reexamination of U.S. Pat. No. 7,478,467, Sep. 12, 2012.
Fetsuga, Robert M., Office Action in Inter Partes Reexamination, Control No. 95/002,197, dated Nov. 15, 2012.
Ductmate Industries, Inc., Response to Office Action in Inter Partes Reexamination, Control No. 95/002,197, dated Jan. 15, 2013.
Third Party Requester's Comments to Patent Owner's Response, Control No. 95/002,197, Feb. 13, 2013.
Ductmate Industries, Inc., Supplemental Information Disclosure Statement filed for Reexamination Control No. 95/002,197, Feb. 22, 2013.
Third Party Requester's Comments to Patent Owner's "Response" of Feb. 22, 2013 for Reexamination Control No. 95/002,197, Mar. 14, 2013.
Ductmate Industries, Inc., Second Supplemental Information Disclosure Statement filed for Reexamination Control No. 95/002,197, May 23, 2013.
Fetsuga, Robert M., Action Closing Prosecution in Inter Partes Reexamination, Control No. 95/002,197, Jun. 12, 2013.

Ductmate Industries, Inc., Response to Action Closing Prosecution, Control No. 95/002,197, dated Jul. 12, 2013.
Third Party Requester's Comments to Patent Owner's Response to Action Closing Prosecution, Control No. 95/002,197, Aug. 12, 2013.
Fetsuga, Robert M., Office Communication for Reexamination Control No. 95/002,197, dated Aug. 14, 2013.
Ductmate Industries, Inc., Supplemental Information Disclosure Statement filed for Reexamination Control No. 95/002,197, Aug. 27, 2013.
Request for Inter Partes Reexamination of U.S. Pat. No. 8,151,430, Sep. 14, 2012.
Fetsuga, Robert M., Office Action in Inter Partes Reexamination, Control No. 95/002,296, dated Nov. 15, 2012.
Response to Office Action in Inter Partes Reexamination, Control No. 95/002,296, dated Jan. 15, 2013.
Third Party Requester's Comments to Patent Owner's Response, Reexamination Control No. 95/002,296, Feb. 13, 2013.
Ductmate Industries, Inc., Supplemental Information Disclosure Statement filed for Reexamination Control No. 95/002,296, Feb. 22, 2013.
Third Party Requester's Comments to Patent Owner's "Response" of Feb. 22, 2013 for Reexamination Control No. 95/002,296, Mar. 14, 2013.
Ductmate Industries, Inc., Second Supplemental Information Disclosure Statement filed for Reexamination Control No. 95/002,296, May 23, 2013.
Fetsuga, Robert M., Action Closing Prosecution in Inter Partes Reexamination, Control No. 95/002,296, Jun. 12, 2013.
Ductmate Industries, Inc., Response to Action Closing Prosecution, Control No. 95/002,296, dated Jul. 12, 2013.
Third Party Requester's Comments to Patent Owner's Response to Action Closing Prosecution, Control No. 95/002,296, Aug. 12, 2013.
Fetsuga, Robert M., Office Communication for Reexamination Control No. 95/002,296, dated Aug. 14, 2013.
Ductmate Industries, Inc., Supplemental Information Disclosure Statement filed for Reexamination Control No. 95/002,296, Aug. 27, 2013.
Lily Truong, Examiner's Report for Canadian Patent Application No. 2,780,917, dated Oct. 18, 2013.
Christine Genge, Amendments/Remarks Following Examiner's Report for Canadian Patent Application No. 2,780,917, dated Apr. 22, 2014.
License Agreement, [143], Dec. 2, 2014, *Ductmate Industries, Inc.* v *Famous Distribution* Case No. 2:12-cv-01440-AJS.
Judge Aruther J. Schwab, Order to Dismiss Case With Prejudice [Doc 145], Dec. 2, 2014, *Ductmate Industries, Inc.* v *Famous Distribution*, Case No. 2:12-cv-01440-AJS.
Response to Examiner's Report for Canadian Patent Application No. 2,780,917, dated Apr. 22, 2014.
John W. McIlvaine, Special Master's Revised Report and Recommendation [Doc 106], Jun. 20, 2014.
Famous Industires, Inc. and Famous Distribution, Inc., Defendants' First Amended Answer and Counterclaims to Amended Complaint for Patent Infringement [Doc 124], Jul. 16, 2014, *Ductmate Industries, Inc.* v *Famous Distribution, Inc. et al*, Case No. 2:12-cv-01440-AJS.
Ductmate Industries, Inc., Ductmate's Response to Defendants' Objections [114] to the Special Master's Revised Report and Recommendation [106] [Doc 125], Jul. 24, 2014, *Ductmate Industries, Inc.* v *Famous Distribution, Inc. et al*, Case No. 2:12-cv-01440-AJS.
Ductmate Industries, Inc. Plaintiff Ductmate's Brief in Support of its Motion to Strike Defendants' Affirmative Defense of Inequitable Conduct and to Dismiss Defendants' Counterclaim for Declaratory Judgment of Unenforceability Due to Inequitable Conduct [Doc 129], Jul. 25, 2014, *Ductmate Industries, Inc.* v *Famous Distribution, Inc. et al*, Case No. 2:12-cv-01440-AJS.
Judge Aruther J. Schwab, Order of the Court Regarding: Revised Special Master Report and Recommendation (Doc. No. 106) and Objections Thereto (Doc. Nos. 112 and 113) [Doc 131], Aug. 8, 2014, *Ductmate Industries, Inc.* v *Famous Distribution, Inc. et al*, Case No. 2:12-cv-01440-AJS.

(56) References Cited

OTHER PUBLICATIONS

Famous Industires, Inc. and Famous Distribution, Inc., Defendants' Brief in Opposition to the Motion to Dismiss [Doc 132], Aug. 8, 2014, *Ductmate Industries, Inc.* v *Famous Distribution, Inc. et al*, Case No. 2:12-cv-01440-AJS.
Ductmate Industries, Inc., Plaintiff's Reply in Support of Its Motion to Strike (Doc. 128) [Doc 135], Aug. 14, 2014, *Ductmate Industries, Inc.* v *Famous Distribution, Inc. et al*, Case No. 2:12-cv-01440-AJS.
Famous Industires, Inc. and Famous Distribution, Inc., Defendants' Sur-Reply in Opposition to Plaintiff Ductmate's Motion to Dismiss and Motion to Strike [Doc 136], Aug. 15, 2014, *Ductmate Industries, Inc.* v *Famous Distribution, Inc. et al*, Case No. 2:12-cv-01440-AJS.
Judge Aruther J. Schwab, Memorandum Order re: Plaintiff's Motion to Strike, Affirmative Defense of Inequitable Conduct and Motion to Dismiss for Failure to State a Claim re: Counterclaim for Declaratory Judgment of Unenforceability (Doc. No. 128) [Doc 137], Aug. 19, 2014, *Ductmate Industries, Inc.* v *Famous Distribution, Inc. et al*, Case No. 2:12-cv-01440-AJS.
Civil Docket for *Ductmate Industries, Inc.* v *Famous Distribution, Inc. et al*, Case No. 2:12-cv-01440-AJS, Oct. 8, 2014.
United States Patent and Trademark Office, Patent Withdrawal Notice, Jun. 18, 2013.
Nordson Corporation, FoamMelt 200 Adhesive Applicator, Feb. 2003.
Nordson Corporation, The Nordson FoamMelt Process, Run Circles Around Other Methods of Product Assembly, Dec. 1989.
Ductmate Industries, Inc. Response to Action Closing Prosecution, Jul. 12, 2013, Reexamination Control No. 95/002,296.
Third Party Requester's Comments to Patent Owner's Response to Action Closing Prosecution, Reexamination Control No. 95/002,296, filed Aug. 12, 2013.
Fetsuga, Robert M., Transmittal of Communication to Third Party Requester Intern Partes Reexamination, Control No. 95/002,296, Aug. 14, 2013.
Notice of Appeal, Reexamination Control No. 95/002,296, filed Oct. 24, 2013.
Inter Partes Reexamination Appellant's Appeal Brief, Reexamination Control No. 95/002,296, filed Dec. 24, 2013.
Respondent Brief, Reexamination Control No. 95/002,296, filed Jan. 23, 2014.
Amended Respondent Brief, Reexamination Control No. 95/002,296, filed Feb. 24, 2014.
Fetsuga, Robert M., Examiner's Answer to Appeal Brief, Apr. 18, 2014.
Request for Oral Hearing, Control No. 95/002,296, Jun. 17, 2014.
Fetsuga, Robert M., Right of Appeal Notice, Control No. 95/002,296, filed Sep. 24, 2013.
United States Patent Application File History, "System and Method of Sealing Seams of Heating and Cooling Products," U.S. Appl. No. 12/054,885, filed Mar. 25, 2008.
Judge Aruther J. Schwab, Order of the Court Regarding: Clerk is to mark Case Closed, Oct. 2, 2014, *Ductmate Industries, Inc.* v *Famous Distribution, Inc. et al*, Case No. 2:12-cv-01440-AJS.
The Lockformer Company, Lockformer Product Catalog, 2004.
The Lockformer Company, Lockformer Round/Oval Pipe Machine, 2004.
Polymer Adhesive Sealant Systems, Inc., Air-Tite #444 Water Based Pumpable Seam Sealant (obtained from Trademark Office).
Martin, Brett C., Decision on Appeal, Appeal No. 2014-007488, Reexamination Control No. 95/002,197, Jun. 30, 2015.
Laufer, Pinchus M., Decision Dismissing Patent Owner's Petition to Vacate Filing Date of Reexamination, Reexamination Control No. 95/002,197, Aug. 4, 2015.
Laufer, Pinchus M., Decision Dismissing Patent Owner's Petition to Vacate Filing Date of Reexamination, Reexamination Control No. 95/002,296, Aug. 4, 2015.
Laufer, Pinchus M., Decision Granting Patent Owner's Petition to Vacate Filing Date of Reexamination, Reexamination Control No. 95/002,119, Aug. 4, 2015.
Polymer Adhesives Sealant Systems, Inc., Air-Tite 444 Material Safety Data Sheet (MSDS), Feb. 2, 2008.
Polymer Adhesives Sealant Systems, Inc., Air-Tite 444 Water Based Pumpable Seam Sealant webpage PDF, May 2011.
United States Court of Appeals for the Federal Circuit, *Spectralytics, Inc.* v. *Cordis Corporation and Norman Noble, Inc.*, 2009-1564, 2010-1004, Jun. 13, 2011.
Deposition of William R. Gray (redacted), Sep. 23, 2013.
Lynne H. Browne, Patent Trial and Appeal Board, Decision on Appeal, Appeal No. 2013-003822, U.S. Appl. No. 11/779,786, Aug. 14, 2015.
Declaration of Douglas G. Gudenburr, Sep. 1, 2015.
Polymer Adhesives Sealant Systems, Inc., Trademark Application for "AIR-TITE" U.S. Appl. No. 76/011,077, filed Mar. 27, 2000.
Ductmate Industries, Inc., Petition Under 37 C.F.R. 1.182 and/or 1.183 Requesting Continued Reexamination, Reexamination Control No. 95/002,197, Sep. 23, 2015.
United States Patent and Trademark Office, Office Action in Ex Parte Reexamination, U.S. Appl. No. 90/014,073, dated Jun. 5, 2018.
Response to Office Action, U.S. Appl. No. 90/014,073, dated Aug. 6, 2018.
United States Patent and Trademark Office, Office Action in Ex Parte Reexamination, U.S. Appl. No. 90/014,073, dated Aug. 31, 2018.

* cited by examiner

Table A

| static pressure | 12" unsealed | 12" sealed | 6" unsealed | 6" sealed |
|---|---|---|---|---|
| 0.5 | 1.1 | 0.02 | 0.78 | 0.02 |
| 1 | 2.4 | 0.02 | 1.97 | 0.02 |
| 2 | 4.4 | 0.02 | 4.4 | 0.02 |
| 4 | 6.5 | 0.02 | 8.7 | 0.02 |
| 6 | 7.9 | 0.05 | 11.8 | 0.03 |
| 9 | 10.3 | 0.17 | | 0.068 |
| 10 | | 0.33 | | 0.08 |

Table B

| static pressure | 12" unsealed pipe | 12" sealed pipe | 6" unsealed pipe | 6" sealed pipe |
|---|---|---|---|---|
| 0.5 | 12.29 | 1.52 | 10.27 | 1.52 |
| 1 | 18.45 | 1.52 | 16.64 | 1.52 |
| 2 | 25.30 | 1.52 | 25.30 | 1.52 |
| 4 | 31.00 | 1.52 | 36.08 | 1.52 |
| 6 | 34.31 | 2.45 | 42.29 | 1.88 |
| 9 | 39.40 | 4.64 | | 2.88 |
| 10 | | 6.56 | | 3.14 |

Table C

| Static pressure | 12" pipe | 6" pipe |
|---|---|---|
| 0.5 | 87.60% | 85.17% |
| 1 | 91.74% | 90.85% |
| 2 | 93.98% | 93.98% |
| 4 | 95.09% | 95.78% |
| 6 | 92.85% | 95.55% |
| 9 | 88.21% | |
| 10 | | |

*Fig. 15*

SELF-SEALING CIRCULAR CROSS-SECTION SHEET METAL DUCT AND METHOD FOR MANUFACTURING A SEALED CIRCULAR CROSS-SECTION DUCT

CROSS-REFERENCE TO RELATED APPLICATION

This Application is a continuation of prior application Ser. No. 13/335,188, filed Dec. 22, 2011, which in turn is a Divisional of application Ser. No. 12/041,865, filed Mar. 4, 2008, which issued as U.S. Pat. No. 8,151,430 on Apr. 10, 2012, which in turn is a Divisional of application Ser. No. 11/739,238, filed Apr. 24, 2007, which issued as U.S. Pat. No. 7,478,467 on Jan. 20, 2009 and which claims the benefit of U.S. Provisional Application No. 60/746,573, filed May 5, 2006. Application Ser. No. 13/335,188, application Ser. No. 12/041,865, now U.S. Pat. No. 8,151,430, application Ser. No. 11/739,238, now U.S. Pat. No. 7,478,467, and U.S. Provisional Application No. 60/746,573 are hereby incorporated by reference.

BACKGROUND OF THE INVENTION

Field of the Invention

This invention relates to ducts used in the heating, ventilating, exhaust and/or air conditioning fields.

Description of Related Art

Ducts having circular, rectangular, or other cross sectional shape are used to transport heated or cooled air or other gasses from one place to another. A typical example is heated or cooled air from an air conditioner or furnace is transported to individual locations by a duct. These types of ducts are formed from sheet metal. The sheet metal is formed into a particular shape by taking ends of the sheet metal and interlocking them.

In circular duct work it is most common to have a self locking type of seam on the duct work that is put together by an installer. Typical examples of self locking mechanisms are reeves locks and button locks.

Previously, liquid (mastic) sealant was used for sealing rectangular duct work. Rectangular duct work is typically sold made to order. Manufacturers of rectangular ducts will manufacture the duct work to the specification of the installer. Therefore when supplying sealed rectangular ductwork it is already constructed prior to being shipped and the sealant is never exposed.

Circular duct work with reeves locks or button locks is typically shipped in bundles. An installer will then remove individual pieces from the bundle and then snap the seam of the duct together via the interlocking mechanism to create a circular duct. 5' pieces are shipped with 1 piece locked with 4 pieces around it for a total of 5. 2' pieces are shipped with 1 piece locked with 9 pieces around it for a total of 10 pieces. On some small sizes, all of the pieces can be locked.

However, these types of self locking mechanisms leak and cause inefficiency. This is problematic because of the cost of energy. A liquid sealant would not work with circular duct work having a self locking mechanism because the machines that manufacture the circular ductwork are not compatible with liquid sealant. The machines that manufacture circular ducts cannot use a liquid sealant because the liquid sealant will tend to flow or string outside of the applied area and onto the forming rolls. Once on the forming rolls, the machinery will not function properly. Because circular duct is shipped in bundles, parts of the duct where the liquid sealant is applied contact other parts of the duct. This causes the liquid sealant to adhere to the interior and/or exterior of the duct. The excess liquid sealant serves as dirt collection points for ducts in service and extra cleaning requirements for the exterior of exposed duct systems. No installer would buy circular duct work with a liquid sealant because the mess created by the liquid sealant would require additional cleaning. Additionally, when circular duct work is installed it may have to be cut by the installer. The cutting is done with the self locking mechanism disengaged. It sometimes becomes necessary for the installer to engage the self locking mechanism and then to disengage it. This is not possible with the liquid sealant that has been used in square duct work. If the liquid sealant is used with circular duct having a self locking mechanism and the self locking mechanism is disengaged, the integrity of the sealant would be compromised, thus causing failure to seal when re-engaged. Additionally, the sealant will be all over the inside and outside of the duct which will contaminate the air flow and can also collect dust on both the inside and outside of the duct. The collection of dust inside the duct can lead to mold growth, potentially creating indoor air quality hazards. The excess liquid sealant on the outside of the duct creates difficulty in painting the duct or resealing the duct as it could react with paint or sealant. The liquid sealant also off gasses VOCs into the air. Therefore, the liquid sealant is not used with circular duct work and there is no known circular duct work that is sold with sealant already applied.

Currently if a self locking circular sealed system is required, the installer assembles the ductwork and then has to use additional materials, such as tape or sealant and labor to have a sealed system.

There is a need for a sealed self locking circular system that does not require the installer to seal or tape the ductwork in order to reduce energy consumption and create efficiency.

BRIEF SUMMARY OF THE INVENTION

This invention provides a sheet metal duct having a sealant and provides a method of manufacturing the sheet metal duct with the sealant. The sheet metal duct is formed by an interlocking mechanism which is made up of a female portion and a male portion on ends of the sheet metal that engage each other. Sealant is placed in either the female portion or the male portion of the interlocking mechanism. The sealant could be a foam sealant and the sealant could be a type of sealant that allows an installer to disengage and then reengage the interlocking mechanism. The sealant could also be the type that requires tape or that does not require tape. The locking mechanism could be a reeves lock or a button lock pursuant to SMACNA Rules 6a, 6b, 7 and 8.

This invention also provides for a method for manufacturing a sheet metal duct. Sheet metal having a snap lock mechanism is provided. Sealant is inserted into the snap lock mechanism. The sheet metal is then formed into a duct. The sheet metal could be provided in strips. The snap lock mechanism could be formed into the sheet metal by a forming machine. The snap locking mechanism can have a male portion and a female portion that is created by the forming machine rolls. The sealant could be inserted into the female portion. The female portion can be created by folding the sheet metal to create a fold having a gap. The forming could be done by multiple rolls, each roll forming the sheet metal further lessening the angle of the gap until the desired angle gap is created. The sealant can be inserted into the gap when the angle of the gap is between ninety (90) and ten (10)

degrees. The sealant can be inserted by a nozzle in between the second (2$^{nd}$) and eighth (8$^{th}$) roll.

An object of this invention is to provide a sealed duct system directly from the manufacturer without requiring the installer to take additional steps such as applying sealant or tape.

BRIEF DESCRIPTION OF THE DRAWINGS

FIG. 15 shows tables a, b, and c showing the experimental pressure and leakage data.

DETAILED DESCRIPTION

Examples and Explanatory Definitions

Figure 1:
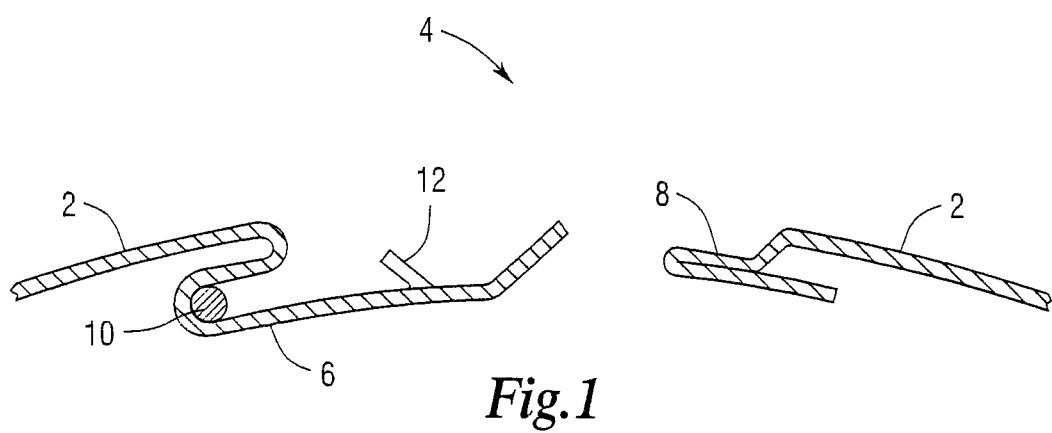
FIG. 1 shows a cross section side view of a disengaged button lock with sealant.

"sheet metal duct"—Metal in the form of a sheet that is formed into a pipe, tube, or channel that conveys a substance.

"circular sheet metal duct"—A pipe, tube, or channel that conveys air or a gas having a circular cross section. This can be round or oval.

"self sealing"—Sealing without the installer having to take any additional steps outside of normal installation of circular duct.

"HVAC sealant"—Something that limits air leakage through a joint.

"a liquid applied gasketing sealant"—Any sealant that is applied as a liquid and then solidifies to have sufficient compressibility so that it can form an air tight seal. After the sealant solidifies it hardens to the point where it can compress to make a seal. It is sufficiently hard so that when the self locking mechanism is engaged the sealant will not flow or displace itself out of the applied area, as would happen if a liquid sealant were used. The sealant is formulated with block co-polymers. Examples are butyl and E.P.D. M. rubbers. The sealant could also be a polyurethane foamed in place sealant. Any sealant used is applied as a liquid and forms a gasket. This type of sealant does not string like the mastic sealants do. Because the sealants do not string, this process prevents waste during the application process.

"the sealant has physical properties such that it provides a reusable seal"—A person must be able to close the snap locking mechanism that forms a sealed duct and then undo the locking mechanism and then again close the locking mechanism to create a sealed duct. It can be any sealant that has sufficient cohesive strength to be able to be used repeatedly and have sufficient compressibility so that it can form an air tight seal. The sealant must allow the lock to be able to be opened and closed repeatedly. The sealant is applied as a liquid and then solidifies. After the sealant solidifies it hardens to the point where it compresses to make a seal. There is no flow around or displacement such as when a liquid applied sealant is used.

"engaged"—The male and female portions of the locking mechanism are connected.

"disengaged"—The male and female portions of the locking mechanism are separated from the engaged position.

"reengaged"—The male and female portions of the locking mechanisms are connected after having been previously connected and disconnected.

"sealed duct"—A duct that is designed or modified through the addition of sealants to prevent or eliminate leakage of air through the seam(s) in the boundary wall of the duct.

"self locking mechanism"—Something that allows two edges of sheet metal to be joined together without a separate fastener to form a duct. The seam created by the edges is referred to as the longitudinal seam. Examples of this are a button lock and a reeves lock. (see SMACNA Rules 6a, 6b, 7 and 8)

"a female portion"—Is the part of the connection that receives the other end.

"a male portion"—Is the part of the connection that inserts into the end.

"on edges of the sheet metal"—Sides of the sheet metal that when in contact with the other forms a shape.

"the male portion engages the female portion"—When the duct is joined and formed and the edges are locked into position.

"sealant in the female portion or on the male portion"—Sealant can be added to the male or female portion.

"creating a seal between the female portion and the male portion"—Reducing the amount of air leaking from the joint.

"allows the female and male portion to disengage and reengage"—The ducts can be joined and detached as many times as necessary and the sealant retains its ability to reduce or eliminate leakage. The sealant will remain in place as it was originally applied.

"not covered by tape"—The sealant does not require a protective tape in the end product or during the production process.

"reeves lock"—The locking mechanism as shown in FIG. 1 without the button or a notch protruding from the female end. Examples of this can be seen in SMACNA RL 6A, 6B and 7.

"button lock"—The locking mechanism has a notch (or button) protruding from the female end and is of the type shown in FIG. 1. Examples of this can be seen in SMACNA RL 8.

"inserting sealant into the snap lock mechanism"—Applying sealant or a gasket to the lock mechanism.

"without the seal failing"—Minimal leakage occurring when subjected to pressures not greater than 10 inches of water column or 0.36 psi. Minimal leakage could be less than 10 cfm per linear foot.

"volatile organic compound (VOC)"—Organic chemical compounds that have high enough vapor pressures under normal conditions to significantly vaporize and enter the atmosphere. A wide range of carbon-based molecules, such as aldehydes, ketones, and hydrocarbons are VOCs. It is possible that they can be given off by applying sealant to a duct.

"forming the sheet metal into the shape of a duct"—Giving the sheet metal the desired shape of the duct.

"the exterior surface does not have sealant"—Absence of any sealant being exposed on the outer portion of the duct.

"encapsulated by the sheet metal"—Surrounded by the sheet metal sufficiently that it is not visible from the exterior of the duct or directly exposed to the airstream.

"scrap pieces"—Excess pieces of the sealant produced during the manufacturing process.

"reused in the manufacturing process"—Means that pieces can be used again in manufacturing such as reliquefying the solidified sealant so that it can then be placed in the locking mechanism.

"providing sheet metal having a self locking mechanism"—Supplying sheet metal having a joining mechanism. The sheet metal could be strips or off of a roll.

"sheet metal is provided in strips"—Cut pieces of sheet metal as opposed to coming off of a roll.

"a forming machine"—Machinery capable of forming sheet metal into a desired shape or profile. Examples of this type of machine are machines made by Nor, Maplewood, or Lockformer "machine creates using rolls"—A forming machine that uses rolls to create the desired shape or profile.

"folding the sheet metal to create a fold having a gap"—An edge of sheet metal is formed to create a space.

"each roll forms the sheet metal further lessening the angle of the gap until the desired angle"—Each forming roll further forms or changes the metal to create the desired profile.

"forming process"–Making sheet metal into a duct. A nozzle that inserts the sealant can be used in any part of the forming process.

"in between the $2^{nd}$ and $8^{th}$ roll stand"—The nozzle can be placed between the $2^{nd}$ and $8^{th}$ roll stand in the snap lock forming machine. The machine could be a Nor type machine.

Description

FIG. 1 shows the profile of a sheet metal duct 2 having a self locking mechanism 4 which as illustrated in FIG. 1 is a button lock. The self locking mechanism 4 has a female portion 6 and a male portion 8. Liquid applied gasketing sealant 10 is in the female portion 6 and is not covered by tape. FIG. 1 shows the male portion 8 and the female portion 6 disengaged. There is a button 12 on female portion 6 making the snap locking mechanism 4 a button lock. If button 12 was not there, the locking mechanism would be a reeves lock. It is understood that a person of ordinary skill in the art could alternatively place the sealant on the male portion 8.

Figure 2:
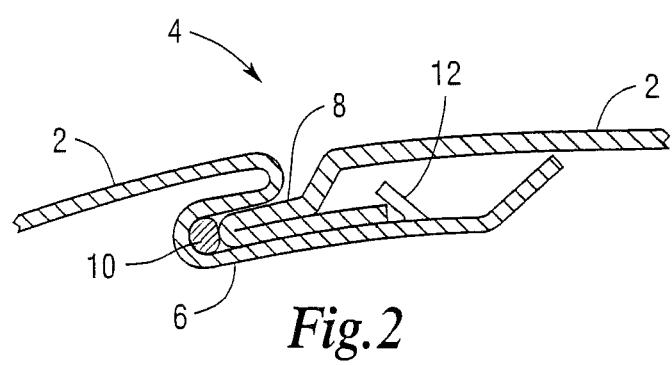
FIG. 2 shows a cross section side view of an engaged button lock with sealant.

FIG. 2 shows the profile of a sheet metal duct 2 having a snap lock mechanism with the male portion 8 engaged with the female portion 6. The liquid applied gasketing sealant 10 prevents air from escaping through the snap locking mechanism 4. The liquid applied gasketing sealant 10 is encapsulated by the sheet metal duct when the self locking mechanism 4 is engaged. The liquid applied gasketing sealant 10 creates a tight fit between female portion 6 and male portion 8 which causes a better connection for the self locking mechanism 4. The better connection of the self locking mechanism 4 reduces vibrations for the duct. When different temperature air is passed through the duct there is expansion and contraction of the duct. The liquid applied gasketing sealant 10 allows for expansion and contraction with minimal vibration because the liquid applied gasketing sealant 10 pushes the lock into place even with contraction and expansion. It is important to get the right amount of liquid applied gasketing sealant 10 on the female portion 6 or the male portion 8. If too much liquid applied gasketing sealant 10 is applied the self locking mechanism 4 may not engage. If too little liquid applied gasketing sealant 10 is applied, the self locking mechanism 4 will not seal properly.

Because the liquid applied gasketing sealant 10 is encapsulated and does not leak out of the locking mechanism, the exterior of the duct can be painted without having to clean or prep or worry about any reaction between the liquid applied gasketing sealant 10 and the paint which can cause problems for the paint. Additionally, because the liquid applied gasketing sealant 10 is not exposed in the interior or exterior of the duct there is no chance that it will attract contaminants that can contaminate the air stream or the ductwork and/or create potential air quality concerns. The liquid applied gasketing sealant 10 does not come into contact with the air stream and does not contaminate it in any way. The liquid applied gasketing sealant 10 does not blow out or leak out when under pressure and does not drip out below a temperature of 220° F. and works at temperatures below −80° F. The liquid applied gasketing sealant 10 also has improved aesthetics compared with externally applied sealant. The liquid applied gasketing sealant 10 is not visible from the outside of the duct.

Having the liquid applied gasketing sealant 10 on the duct during manufacturing lessens the risk of human error of not sealing the metal duct 2 properly or forgetting to seal it. This invention guarantees energy efficiency because just by assembling it, the duct is being sealed. By providing for a self sealing longitudinal seam during manufacturing, it prevents the installer from doing additional work in the air with sealants that off gas (put VOCs into the air). Liquid applied sealants such as mastics can give off VOCs. The liquid applied gasketing material 10 does not collect contaminants such as dust and moisture, which can harbor mold growth. The liquid applied gasketing material 10 does not off gas during operation.

Figure 3:
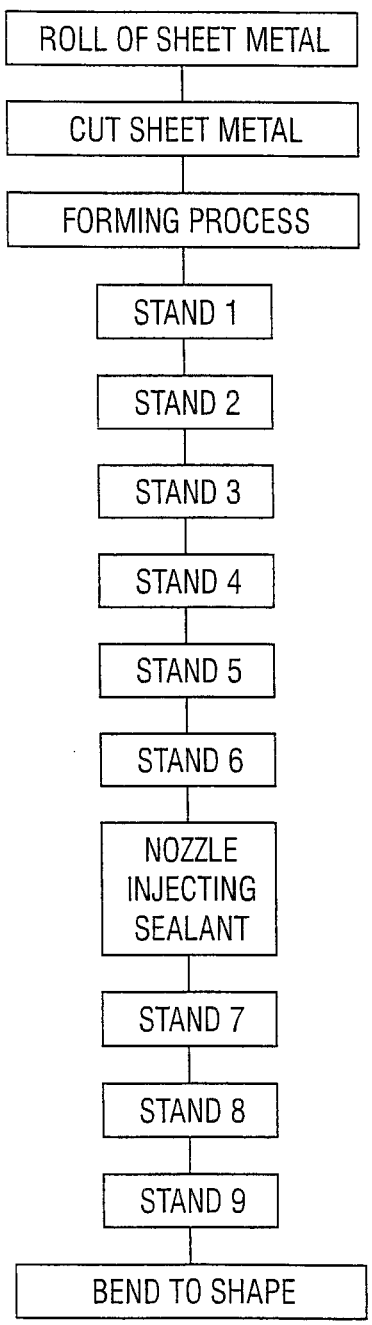
FIG. 3 shows a flow chart of the manufacturing process.
Figure 4:
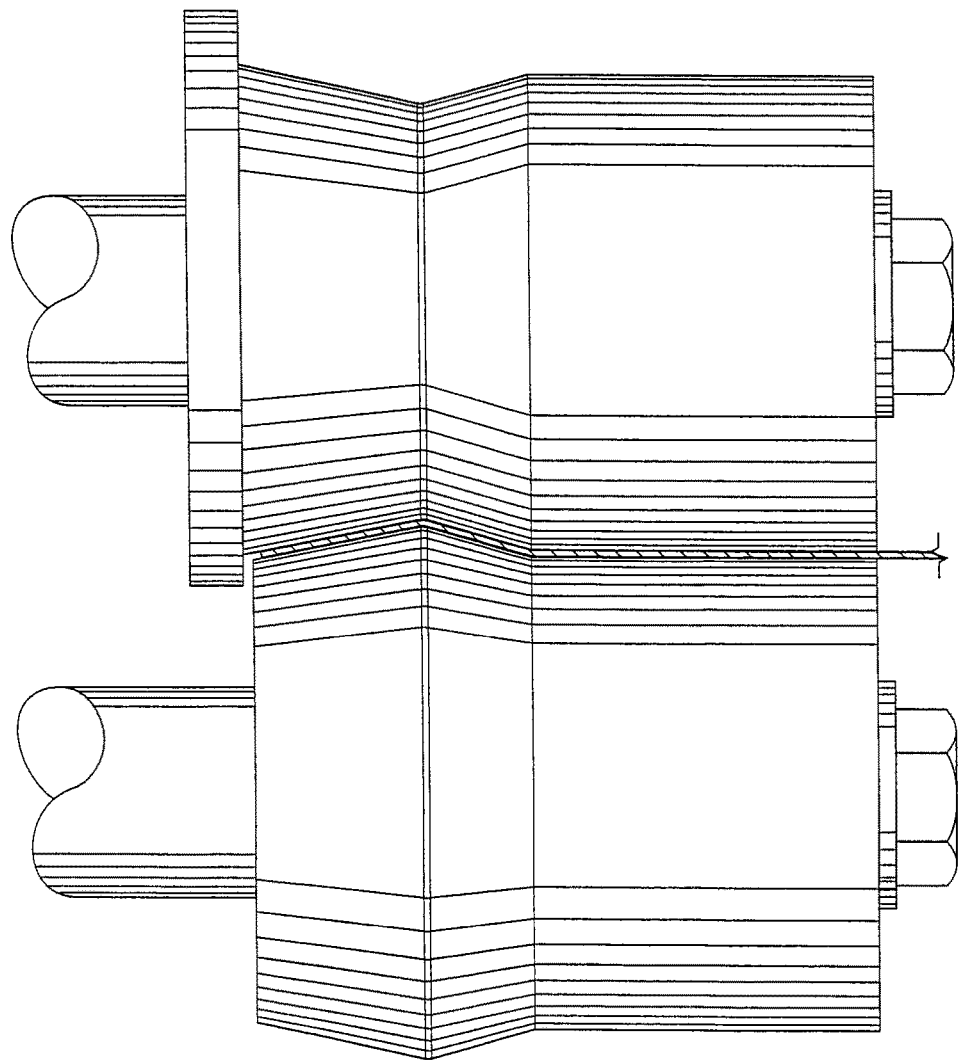
FIG. 4 shows roll stand 1 with sheet metal.
Figure 5:
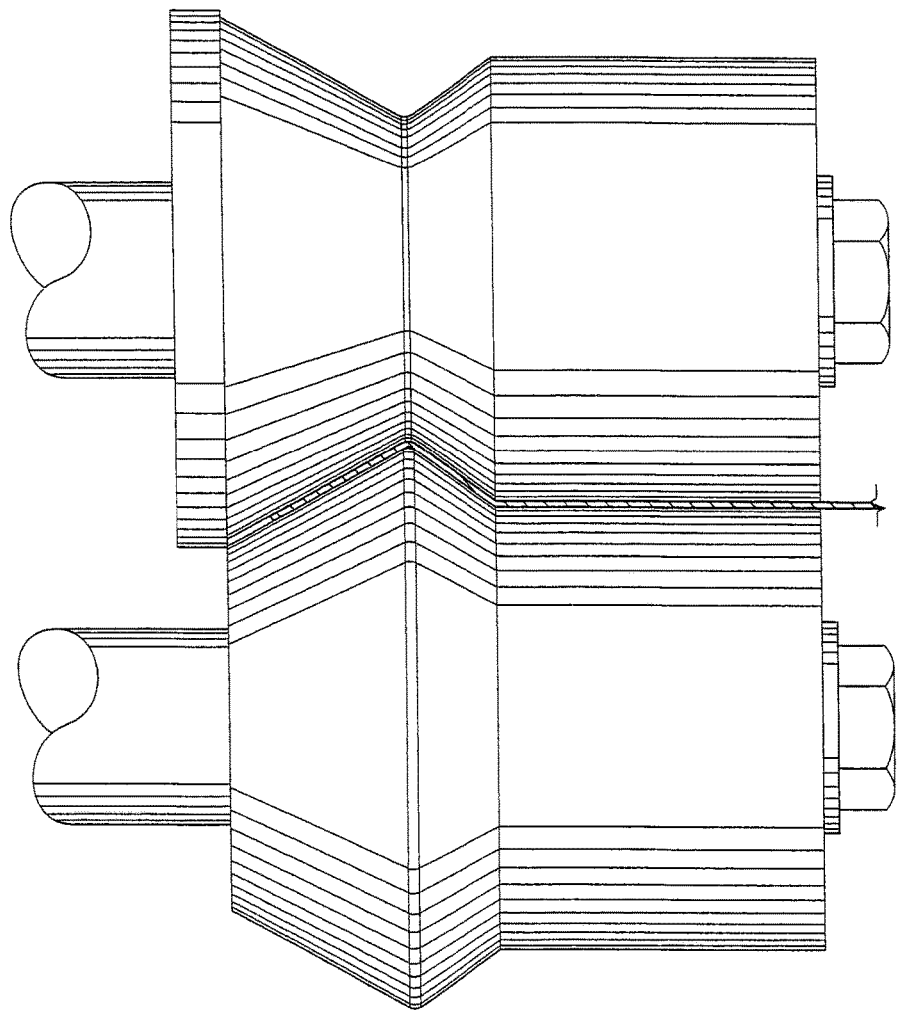
FIG. 5 shows roll stand 2 with sheet metal.
Figure 6:
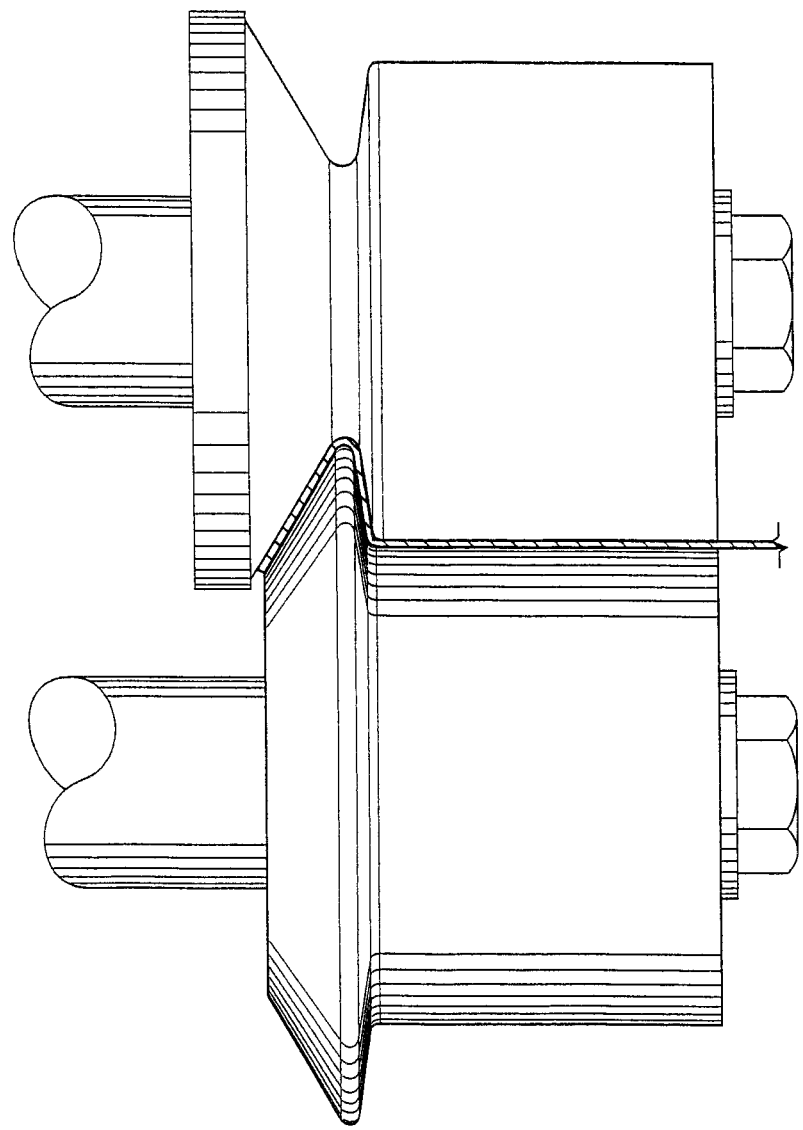
FIG. 6 shows roll stand 3 with sheet metal
Figure 7:
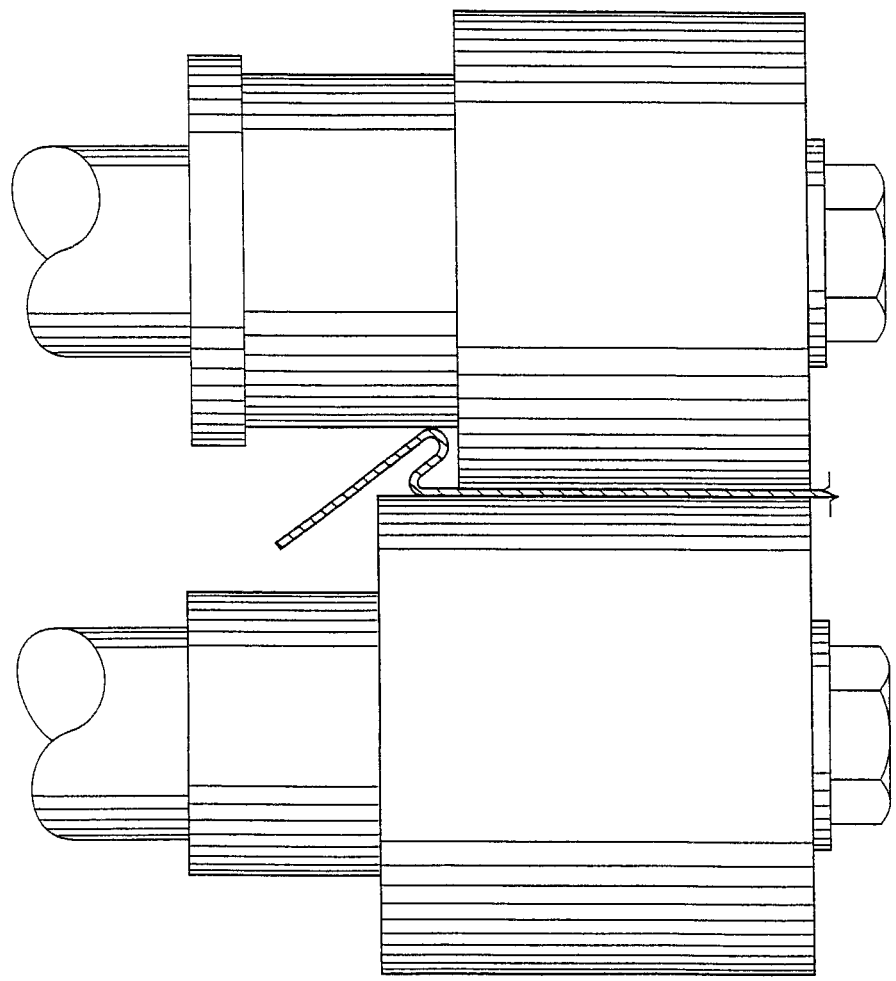
FIG. 7 shows rolls stand 4 with sheet metal.
Figure 8:
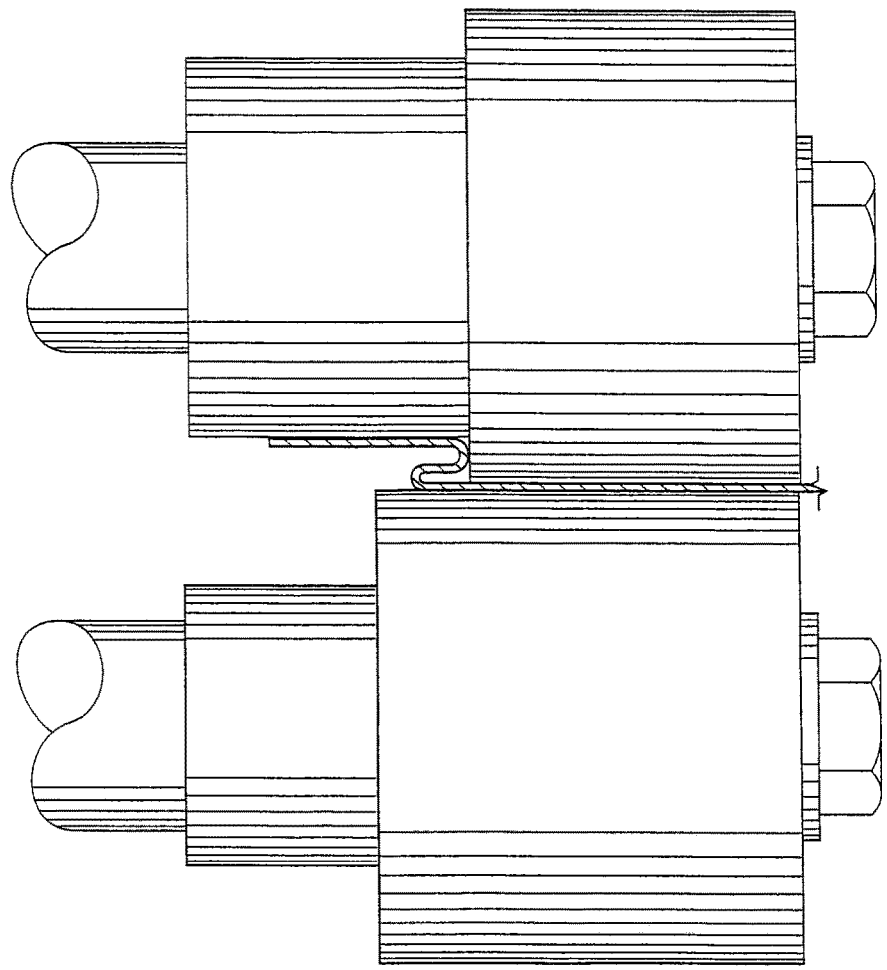
FIG. 8 shows roll stand 5 with sheet metal.
Figure 9:
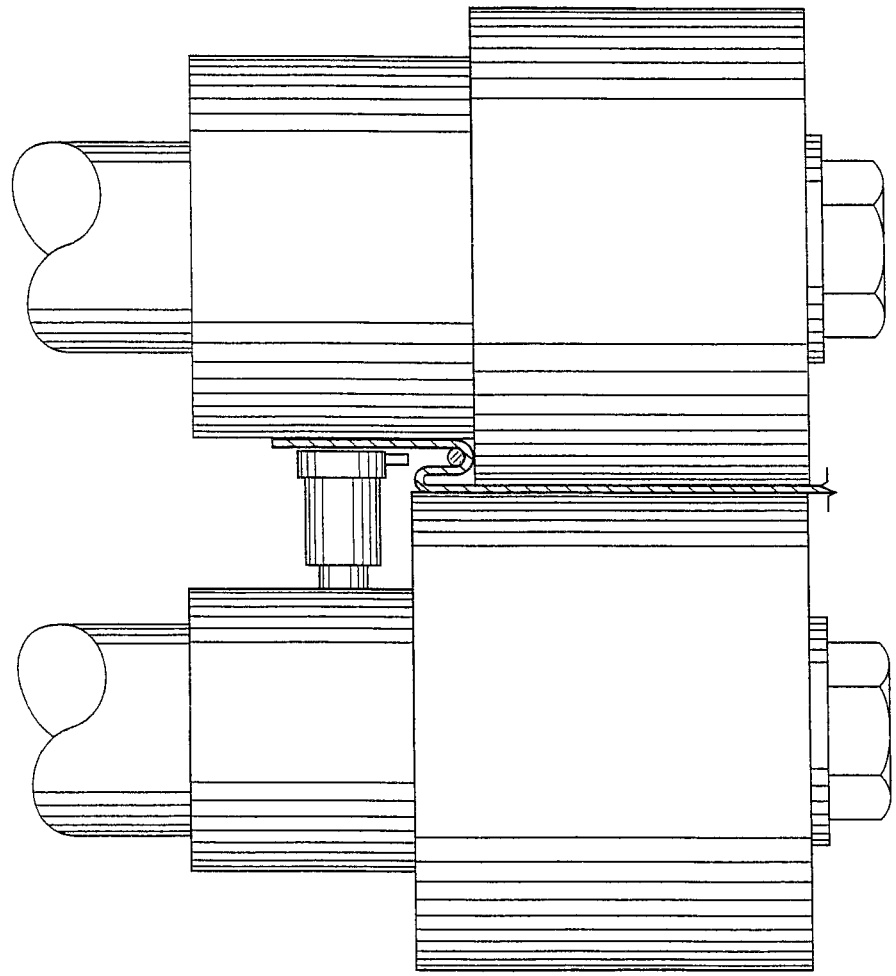
FIG. 9 shows roll stand 6 with sheet metal and the nozzle inserting the sealant in between roll stand 5 and roll stand 6.
Figure 10:
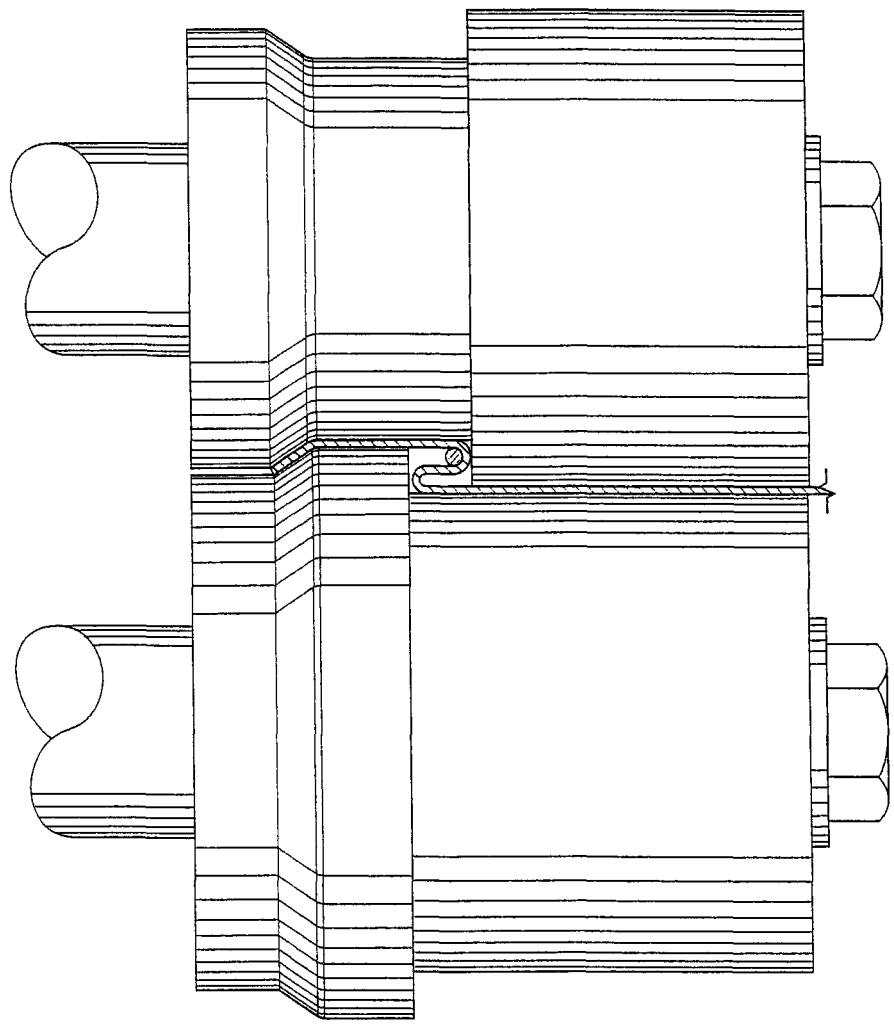
FIG. 10 shows roll stand 7 with the sheet metal having a sealant.
Figure 11:
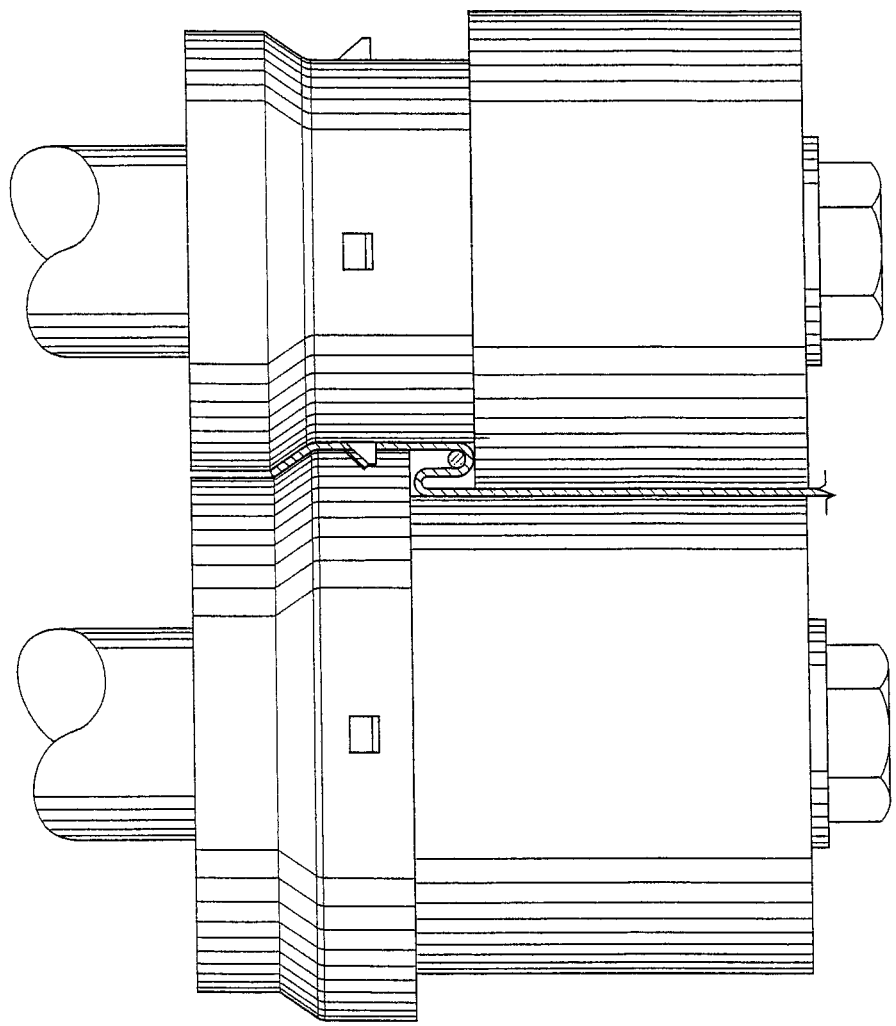
FIG. 11 shows roll stand 8 with the sheet metal having a sealant.

FIG. 3 is a block diagram showing the method of manufacturing sheet metal. Sheet metal can be on a roll. The sheet metal off of the roll is then cut to lengths. The cut lengths of sheet metal are then sent to a forming process where an interlocking mechanism is created by rolls (or stands). An injection nozzle is used to insert sealant into or onto the sheet metal. This can be done in any part of the manufacturing process. Preferably it is inserted between the $2^{nd}$ and $8^{th}$ roll stand. It could be inserted between any of $2^{nd}$, $3^{rd}$, $4^{th}$, $5^{th}$, $6^{th}$, $7^{th}$, or $8^{th}$ stand. Preferably it will be inserted when there is a gap angle between 120 and 1 degree. Most preferably it will be inserted in a gap angle between 90 and 10 degrees. Once the sheet metal passes through all of the stands and nozzles it then is formed to the desired shape of the duct.

A typical type of roll stand and how the metal is formed can be seen in FIGS. 4 through 11. It is understood to those skilled in the art that the roll forming machine has roll stands on both sides of the machine. The opposite side of the machine not shown in FIG. 4 through 11 forms the male portion 8 of the self locking mechanism 4. It is understood that a person of ordinary skill in the art could take the teachings shown and apply them so that the liquid applied gasketing material 10 could be applied on the male portion of the roll forming press.

Typically snap lock pipe is only endorsed for use in duct systems that do not exceed 2" w.c. of pressure. This is because of the leakage. The new sealed pipe is capable of much higher pressures with minimal leakage. It can hold 10 inches water column.

Figure 12:
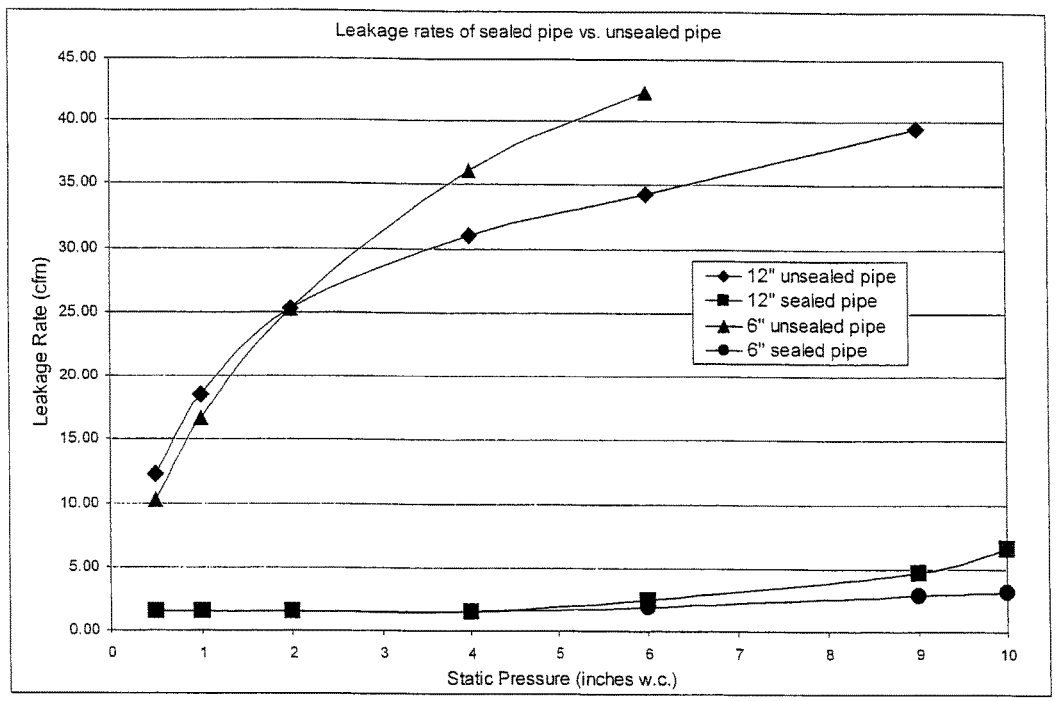
FIG. 12 is a chart of showing leakage rates of sealed vs. unsealed.

FIG. 12 shows testing results of ducts having the liquid applied gasketing material vs. ducts without the material. Each test duct consisted of ten 5' sections of pipe. The joints were sealed with sealant applied to the inside of the female connection and the outside of the male connection. The sections were fastened using 3 evenly spaced sheet metal screws. The sealant was given ample time to cure. 6" and 12" diameter pipe were tested.

The test equipment was a Merriam Instruments digital Smart Manometer and a 3" calibrated orifice tube. Testing was done at ½, 1", 2", 4", 6", and 9" positive pressures and ½" and 1" negative pressure.

Figure 13:
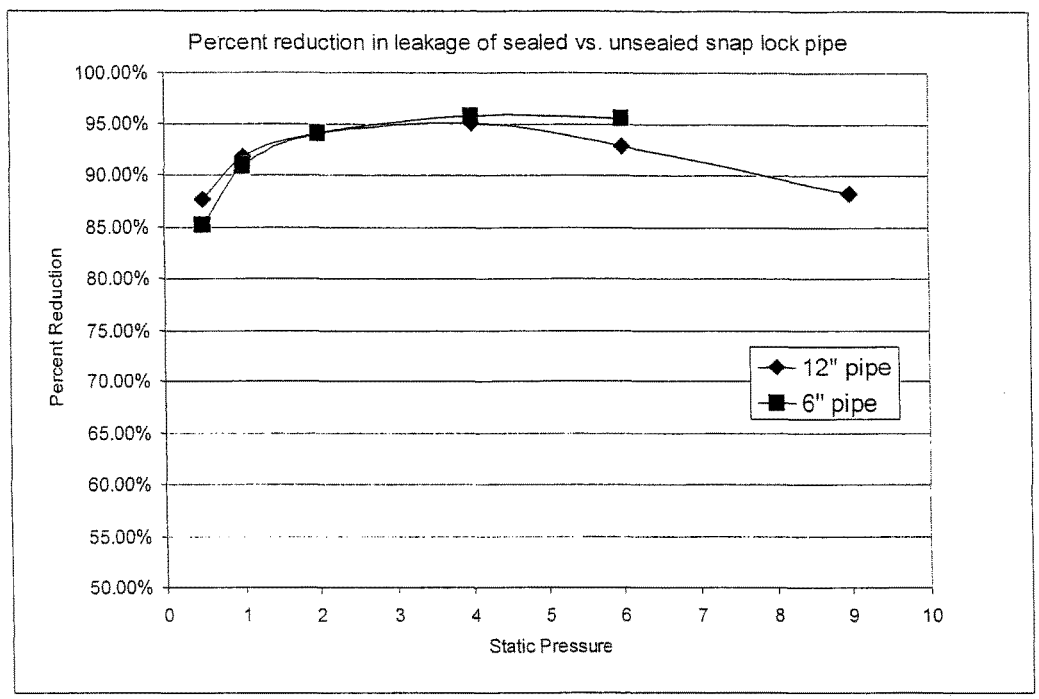
FIG. 13 is chart showing the percent leakage.

Even at lower pressures, there was a significant difference in leakage rates. At 2" w.c., the unsealed pipe leaked about 25 cfm (0.5 cfm per linear foot) compared with 1.5 cfm (0.03 cfm per linear foot) for the sealed pipe. This is about a 95% reduction in leakage. FIG. 13 shows a chart of the percentage of reduction leakage. FIG. 15 shows data tables for the testing.

Figure 14:
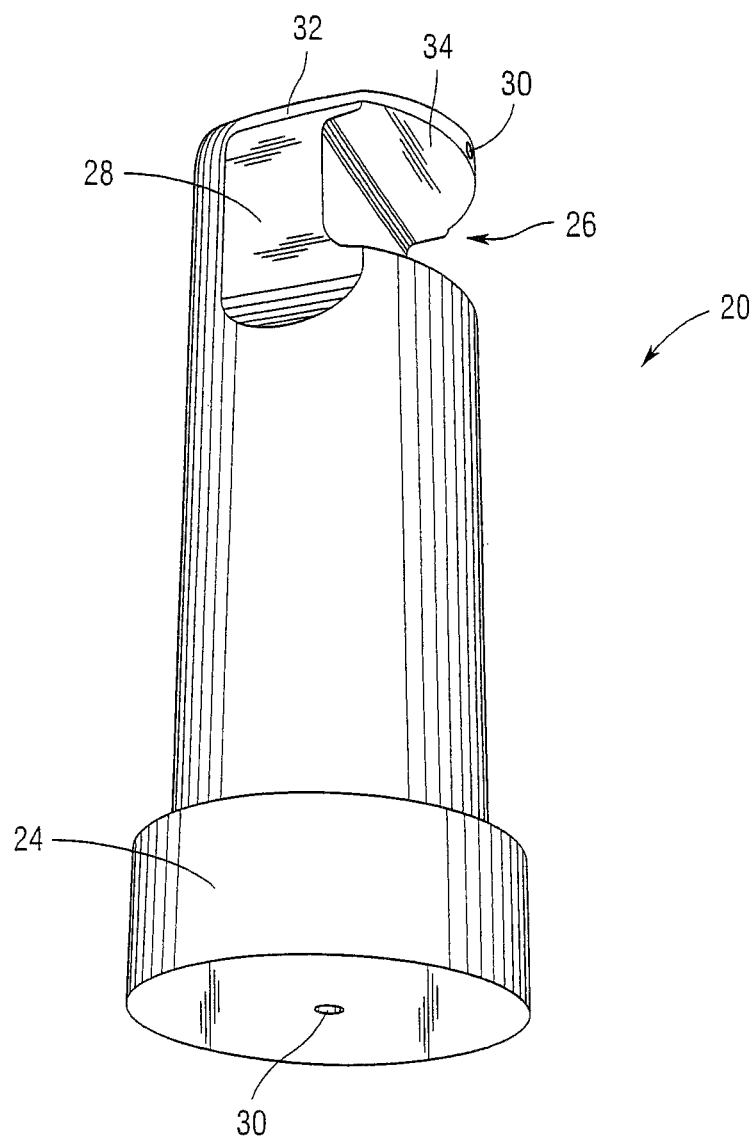
FIG. 14 is the nozzle.

FIG. 14 shows a nozzle 20. The nozzle 20 has a cylindrical body 22. The base 24 has larger diameter than the cylindrical body 22. The upper portion of the cylindrical body 22 has a cut out portion which creates a c-shaped channel 26. The c-shaped channel has notched out sides 28 (only one side is shown the other side is matching). There is a passage way 30 vertically through the cylindrical body 22 and through a vertical portion 32 of the c-shaped channel 26. The passage extends horizontally through a top horizontal section 34 of the c-shaped channel 26. The nozzle 20 is most preferable place between the $5^{th}$ and $6^{th}$ roll stand. This configuration of the nozzle 20 allows it to be placed in between the roll stands and be able to inject sealant into the fold of the ductwork.

Various changes could be made in the above construction and method without departing from the scope of the invention as defined in the claims below. It is intended that all matter contained in the above description, as shown in the accompanying drawings, shall be interpreted as illustrative and not as a limitation.

We claim:

1. A self-sealing circular cross-section sheet metal duct comprising:
    (a) an unassembled circular sheet metal duct having a self locking longitudinal seam with a sealant that is applied as a liquid positioned within the longitudinal seam while the seam is being formed; the sealant solidifies and the sealant allows the self locking longitudinal seam to be engaged, disengaged and reengaged without the sealant stringing; and
    (b) when the longitudinal seam is engaged and thereby simultaneously locking the seam the circular sheet metal duct is formed for installation with a sealed longitudinal seam without an installer applying a sealant.
2. A self-sealing circular cross-section sheet metal duct as recited in claim 1 wherein the self locking longitudinal seam contains a button lock.
3. A self-sealing circular cross-section sheet metal duct as recited in claim 1 wherein the self locking longitudinal seam contains a reeves lock.
4. A self-sealing circular cross-section sheet metal duct as recited in claim 1 wherein the metal duct is capable of a pipe pressure of at least ¼" water column to 10" water column without the seal failing.
5. A self-sealing circular cross-section sheet metal duct as recited in claim 1 wherein the sealant does not give off any volatile organic compound.
6. A self-sealing circular cross-section sheet metal duct as recited in claim 1 wherein there is no off gassing from the sealant during installation or system operation.
7. A self-sealing circular cross-section sheet metal duct as recited in claim 1 wherein an exterior surface of the duct does not have sealant.
8. A self-sealing circular cross-section sheet metal duct as recited in claim 1 wherein the sealant is encapsulated by the sheet metal so that it is not exposed and does not come into contact with an airstream.
9. A self-sealing circular cross-section sheet metal duct as recited in claim 1 wherein the sealant does not blow out under pressure or drip out under heat below a temperature of 220° F.
10. A self-sealing circular cross-section sheet metal duct as recited in claim 1 wherein the self locking longitudinal seam can be engaged and reengaged and then the exterior painted without having to remove excess sealant.
11. A self-sealing circular cross-section sheet metal duct as recited in claim 1 wherein the sealant gives a tighter fit with the self locking longitudinal seam so that vibrations are reduced.
12. A self-sealing circular cross-section sheet metal duct as recited in claim 1 wherein unassembled multiple sheet metal ducts are provided and are stacked in a bundle.
13. The self-sealing circular cross-section sheet metal duct as recited in claim 1 wherein the sealant hardens.
14. A self-sealing circular sheet metal duct comprising:
    (a) a single piece of sheet metal shaped to form a circular duct wherein the duct has an interior and exterior surface;
    (b) a round snap lock longitudinal seam locking mechanism having a female component and a male component roll formed by a circular duct roll former on opposite sides of the single piece of sheet metal;
    (c) the female component of the round snap lock longitudinal seam locking mechanism having a fold inward towards the interior of the duct to form a pocket, a portion of the pocket is located underneath an exterior surface of the sheet metal, the female component also having a holding element opposite the pocket, the pocket is able to receive and removably hold the male component on the opposite side of the single piece of sheet metal when inserted;
    (d) the male component of the round snap lock longitudinal seam locking mechanism having a reverse portion that doubles back upon itself in order that the reverse portion may contact portions of the female component and removably secure the male portion within the female portion of the round snap lock longitudinal seam locking mechanism; and
    (e) a sealant applied as a liquid inserted into the female component of the round snap lock longitudinal seam locking mechanism during manufacture, the sealant solidifies and hardens and is inserted in an amount to allow the male portion to enter into the female portion so that the male portion locks in place without the sealant being displaced out of the round snap lock longitudinal seam locking mechanism and the amount of sealant is sufficient for reduction of air leakage from the round snap locking longitudinal seam locking mechanism; and
    (f) wherein the sealant allows an installer to engage, disengage and reengage the round snap lock longitudinal seam locking mechanism without the sealant stringing in order for the installer to alter the duct to fit a duct system length requirement and thereafter engage the round snap lock longitudinal seam locking mechanism by inserting the male component into the female component whereby the male component contacts the sealant already positioned within the female component to reduce air leakage from the round snap locking longitudinal seam locking mechanism without the an installer having to apply sealant to the round snap lock longitudinal seam locking mechanism.

15. A method of manufacturing a sealed circular cross-section duct comprising:
 a) providing sheet metal:
 b) roll forming a circular duct self locking longitudinal seam on opposite ends of the sheet metal having a female portion and a male portion, the circular duct self locking mechanism allows the duct to be opened and closed;
 c) applying a sealant in liquid form in the circular duct self locking longitudinal seam;
 d) forming the duct in the shape of a circular duct;
 e) wherein the sealant solidifies and hardens and was inserted in an amount to allow the male portion to enter into the female portion so that the male portion locks in place without the sealant being displaced out of the round snap lock longitudinal seam locking mechanism and the amount of sealant is sufficient for reduction of air leakage from the round snap locking longitudinal seam locking mechanism the sealant allows an installer to engage and disengage the round snap lock longitudinal seam locking mechanism without the sealant stringing in order for the installer to alter the duct to fit a duct system length requirement and thereafter reengage the round snap lock longitudinal seam locking mechanism by inserting the male component into the female component whereby the sealant reduces air leakage from the round snap locking longitudinal seam locking mechanism without the an installer having to apply sealant to the round snap lock longitudinal seam locking mechanism.

16. The method as recited in claim 15 wherein the roll forming has at least five roll forming stands.

17. The method as recited in claim 15 wherein the sealant is inserted by a nozzle in between the $2^{nd}$ and $8^{th}$ roll stand.

18. A method as recited in claim 15 wherein the sealant is inserted into a gap in the self locking longitudinal seam when the angle of the gap is between 90 and 10 degrees during roll forming.

* * * * *